March 14, 1950    H. N. HERRICK ET AL    2,500,680
METHOD AND APPARATUS FOR DETERMINING MAGNETIC
PROPERTIES OF WELL CORES
Filed Dec. 6, 1947

INVENTORS
Henry N. Herrick
William M. Schaufelberger

BY:
ATTORNEYS

Patented Mar. 14, 1950

2,500,680

UNITED STATES PATENT OFFICE 2,500,680

METHOD AND APPARATUS FOR DETERMINING MAGNETIC PROPERTIES OF WELL CORES

Henry N. Herrick, Berkeley, and William M. Schaufelberger, Whittier, Calif., assignors to California Research Corporation, San Francisco, Calif., a corporation of Delaware Application December 6, 1947, Serial No. 790,198

2 Claims. (Cl. 175—183)

This invention relates to a method and apparatus for determining the magnetic characteristic of objects, and particularly relates to the orienting of cores taken from the earth so that their original position within the earth may be known.

In the Herrick Patent No. 1,792,693, of February 17, 1931, is described a method and apparatus for orienting cores in which the core is positioned adjacent one end of a suspended magnet system and then slowly rotated while the deflection of the last named system due to its reaction with the residual magnetic field of the well core may be observed and the core oriented. In the Lynton and Herrick Patent No. 2,104,752, issued January 11, 1938, is a modification of the original Herrick apparatus utilizing an astatic magnet suspension with the axis of the magnets parallel to the core axis, the latter being placed horizontally immediately below the lower magnet.

The method and means described in the foregoing patents were usable on a great proportion of the oil well cores which possessed sufficient residual magnetism to actuate the suspended magnet system. However, in certain cases the materials of the cores are so faintly magnetized that insufficient force is exerted reliably to rotate even a delicately suspended magnet system. This invention comprehends broadly a method and apparatus for determining the magnetic polarity of objects such as cores or samples of subsurface formations by positioning them adjacent a system including one of a pair of oppositely connected and rapidly rotating similar or electrically balanced coils or windings and determining from the electrical potentials induced in said windings the magnetic orientation of the object. If the test object is a core from the earth's substructure, the magnetic orientation can be correlated to its structural axis or mass and the core oriented so that its original position in the earth is made known. Desirably but not necessarily, the test object and the coils are at least partially shielded from external magnetic fields such as that of the earth, and means are provided for positioning the object with its structural and magnetic axes substantially at right angles to the axis of rotation of the coils, together with means for rotating the core about its structural axis while keeping its other relations to the rotating coils constant.

It is ordinarily uneconomical to completely shield the core and coils from the earth's magnetic field and from stray fields due to power lines and the like. However, the effect of such stray fields is substantially neutralized by the oppositely connected and closely adjacent coils so that the electrical output thereof is due substantially only to the magnetic properties of the core being investigated.

It is an object of this invention to provide for improved methods and apparatus for determining the relationship between the magnetic axis and the structural axis of a sample of material from within the earth, for example, a well core.

Another object of this invention is to provide an apparatus for investigating the magnetic characteristics of an object by determining the effect produced by it in a rotating coil which is electrically balanced to nullify the effect of currents induced by magnetic fields other than that derived from the test object.

Another object is to provide an improved means for determining the magnetic characteristics of an object such as a well core in a shorter length of time than that heretofore required.

Another object is to provide an apparatus for determining the magnetic characteristics of an object by positioning the latter adjacent one side of a balanced system of opposed, rotating coils so that an unbalanced potential is induced in said coils.

These and other objects and advantages will be found apparent from the following description of a preferred embodiment of this device and from the attached drawing which forms a part of this specification and illustrates one arrangement of the invention as applied to well core orienting.

In the drawing, Figure 1 is a longitudinal and part sectional view of a core orienter constructed according to this invention.

Figure 1:
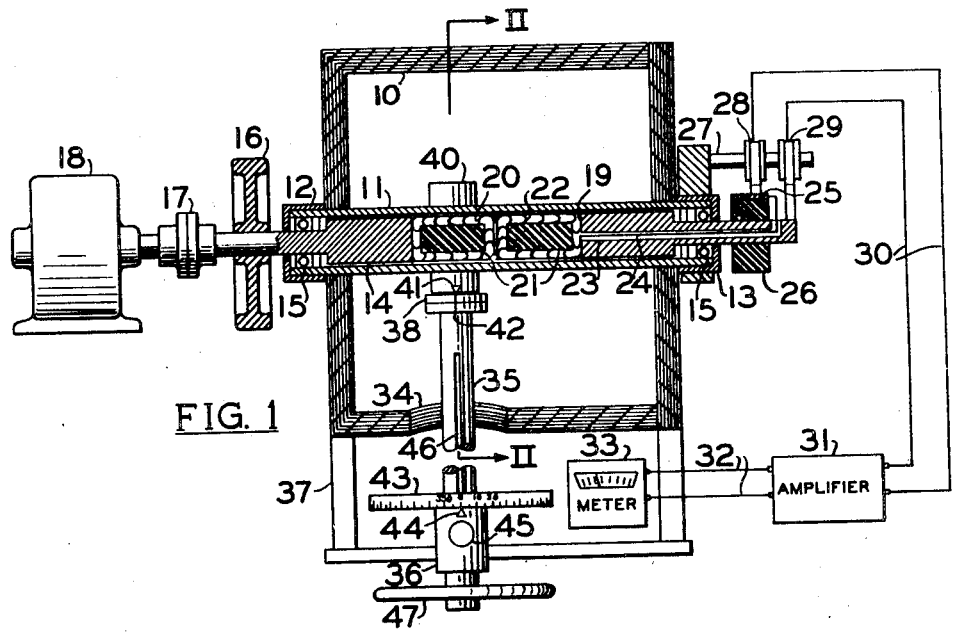

Referring to the drawing and particularly to Figure 1, reference numeral 10 designates a shield to exclude substantially all the external magnetic fields from the mechanism to be described. The shield may be constructed of a plurality of thin laminations of ferromagnetic material of high permeability. Extending through the shield 10 and projecting from its ends for a short distance is a tube 11 of a non-magnetic material. Housings 12 and 13 are fitted over the ends of tube 11 and serve to secure it in shield 10. A shaft 14, also of non-magnetic material, extends through tube 11 and is supported by bearings 15. Adjacent one end of shaft 14 a rotation stabilizer, such as fly wheel 16, may be provided. Shaft 14 is driven through coupling 17 by means of a motor 18, the latter being supplied with electric power from a suitable stable source and desirably rotates from 10,000 to 20,000 R. P. M.

Shaft 14 is provided with an axially disposed longitudinal slot 19 extending throughout a part of its length. In one end of slot 19 is positioned a coil, desirably prewound upon an insulating form 21 and then secured in slot 19 by insulating cement. A second coil 22 similar to coil 20 is secured in the other end of slot 19. Coils 20 and 22 are connected in series and in electrical opposition to each other so that any field which intersects both of them to an equal amount as, for example, the residual earth's magnetic field which penetrates shield 10, will induce equal and opposite voltages due to the rotation of the shaft. In this example one terminal of the series connected coils is grounded to shaft 14 and the other terminal carried out through a passage 23 formed axially through one end of shaft 14 by means of an insulated wire 24 and is connected to a metal segment 25 supported upon an insulating disk 26 secured to shaft 14. The output of coils 20 and 22 is collected, in this example, by means such as a brush holder generally designated 27 which is mounted upon end housing 13 and is adapted to be positioned at any desired angle with respect to the plane of coils 20 and 22. Brush 28 supported upon holder 27 is adapted to contact segment 25 during a small part of the revolution of shaft 14 and disk 26. Brush 29 is adapted to contact the end of shaft 14 continuously. By the arrangement just described, a desired portion of the successive cycles of an unbalanced potential which may be generated within the coil system 20, 22 by the proximity thereto of a magnetic field, such as that of a well core, may be selectively collected by proper adjustment of brush holder 27 and the cooperation of brushes 28 and 29 with segment 25 and shaft 14, respectively.

Although numerous alternatives are available for indicating the values of potentials set up in the coil system 20, 22, in this example leads 30 connect brushes 28 and 29 to an amplifier 31, the output of which is carried by leads 32 to an indicator which may be a strongly damped microammeter.

In order to position a well core or other object whose magnetic characteristics are to be investigated in close proximity to one of coils 20 or 22, an aperture 34 is provided in shield 10 with a shaft 35 extending therethrough. Bearing 36 in a frame 37 serves to position shaft 35 with its longitudinal axis substantially at right angles to the axis of rotation of shaft 11. A table 38, fitted with an index pin 39, is placed on the upper end of shaft 35 and serves to support a correspondingly recessed core 40 on which is placed a fiducial mark 41, the latter desirably being aligned with a similar mark 42 on table 38. An azimuth scale 43 on shaft 35 is similarly alignable with a fiducial mark 44 on bearing 36 so that the angular position of the core may be observed from outside of shield 10. In order to preserve this alignment, scale 43 is illustrated as being splined at 46 to shaft 35. A clamping member 45 is adapted to engage shaft 35 to hold the latter in the raised position as shown in Figure 1 or to lower it so that a core 40 may be placed upon table 38 or removed therefrom. Rotation of the shaft 35 progressively to change the azimuth position of core 40 may be effected by a hand wheel or other means 47.

As illustrated in Figure 1, it has been found desirable to position the indicator 33 close to scale 43 so that for a given azimuth position of core 40 with regard to the axis of shaft 14 the deflection of the indicator 33 may conveniently be observed.

If a continuous type electrical contact such as a slip ring or its equivalent is employed to pick up the induced potential from the rotating coil system 20, 22, suitable changes may be made in the amplifier 31 to produce the desired signal in the indicator 33.

Figure 4:
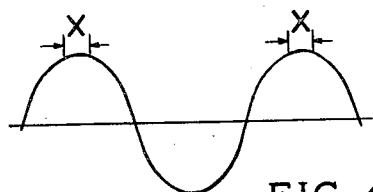
Figure 4 is a graphical representation of a potential output curve showing one mode of commutating the output to correlate the body of the core with its magnetic properties.
Figure 2:
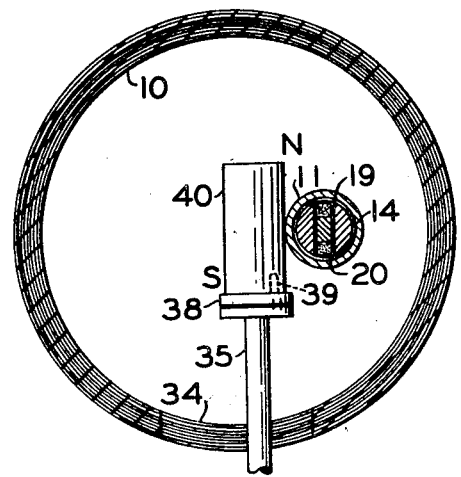
Figure 2 is a transverse section on line II—II of Figure 1.
Figure 3:
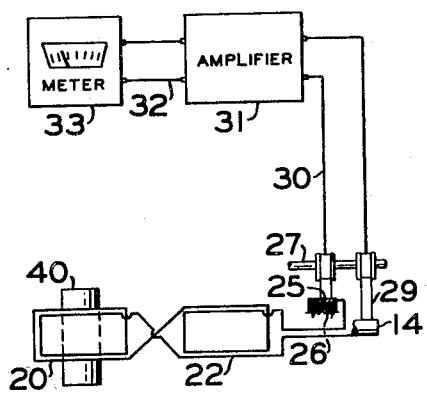
Figure 3 is a schematic diagram of the arrangement of the coils and some of the connected indicating apparatus of Figure 1.

Well cores are generally taken with their longitudinal axes substantially vertical with respect to their original position in the earth. Due to the general inclination of the earth's field with respect to the vertical, the north and south magnetic poles of a given core sample will be found to be asymmetrical with respect to the structural axis, in other words, with cores from the Northern Hemisphere the south pole will be on one side of the core near its top and the north pole on the opposite side near its bottom end. Cores from the Southern Hemisphere would obviously have these relationships reversed. The external field of such a core, when placed in the position shown in Figure 2, will intersect the nearest adjacent coil 20 so that, if the latter is rotated rapidly, an alternating potential will be induced therein. The second coil 22, in this example illustrated as being co-planar and oppositely wound to coil 20, or in any case being electrically connected in opposition to coil 20, will neutralize the effect of any substantially uniform stray magnetic fields, for example, the residual earth's field, which may penetrate shield 10. Thus, the unbalanced potential induced in the coil system will be due substantially only to the external magnetic field of the core 40, and the magnitude of the potentials produced thereby will be dependent upon the relationship between the axis of rotation of shaft 19 and the magnetic axis of core 40 for any azimuth position of the latter. In the arrangement shown, only the peak potentials of a predetermined polarity, such as are shown by the portions X of Figure 4, are impressed upon the amplifier 31 and eventually upon indicator 33 to be compared with the azimuth position of core 40 as indicated by scale 43.

In conclusion, it will be appreciated that the method of core orienting and the means illustrated in this example comprehend broadly the positioning of a core or other object whose magnetic orientation is unknown in close proximity to one of a series of oppositely connected coils which may be placed in rapid rotation, and determining from values of unbalanced potential generated in the coil system, and from the azimuth position of said core with respect to the axis of rotation of said coils, the relation between the magnetic poles of said core and a predetermined point or fiducial mark upon the outer surface of the core which may be related to its structural axis, including evidence of bedding planes and the like.

Although a single embodiment of this invention and its mode of operation have been described and illustrated, it is obvious that numerous changes could be made without departing from the essential features of the invention, and all such changes that come within the scope of the appended claims are embraced thereby.

We claim:
1. The method of determining the relation between the azimuthal relation of a predetermined point on the surface of a well core which is asymmetrically magnetized in an unknown direction, and the N—S magnetic axis of said core, comprising the steps of placing said core adjacent one of a pair of similar longitudinally aligned oppositely connected coils, rotating said coils about their longitudinal axis substantially at right angles to the approximate direction of the magnetic axis of said core, determining values of potential induced in said nearest coil at various azimuthal positions of said core, and observing the angular relation between those potential values which indicate the actual N—S magnetic axis and the said predetermined point on the surface of said core whereby its original position in the earth may be determined.

2. The method of determining the relation between the structural and magnetic axes of a generally cylindrical well core which is asymmetrically magnetized in an unknown direction, comprising the steps of placing said core with its longitudinal axis substantially at right angles to the axis of rotation of a rapidly rotating elongated multiple coil system which is internally electrically balanced and coplanar to be unresponsive to uniform magnetic flux which intersects it, and at such a point along the length of said system that the asymmetrical external magnetic field of said core will cause a flux concentration to induce an unbalanced electrical potential in said coil system, turning said core about its longitudinal axis, measuring the potential in said rotating coil system for various positions of said core, and observing the relation of those potentials which indicate the actual magnetic axis of said core and the azimuthal position of the latter about its longitudinal axis, whereby its original orientation in the earth may be determined.

HENRY N. HERRICK.
WILLIAM M. SCHAUFELBERGER.

REFERENCES CITED

The following references are of record in the file of this patent:

UNITED STATES PATENTS

| Number | Name | Date |
| --- | --- | --- |
| Re. 18,555 | Sperry | Aug. 2, 1932 |
| 1,792,639 | Herrick | Feb. 17, 1931 |
| 1,916,352 | Williams | July 4, 1933 |
| 2,150,922 | Hay | Mar. 21, 1939 |
| 2,211,158 | Pearson | Aug. 13, 1940 |
| 2,359,894 | Brown et al. | Oct. 10, 1944 |

FOREIGN PATENTS

| Number | Country | Date |
| --- | --- | --- |
| 644,858 | Germany | May 14, 1937 |